United States Patent
Ferguson et al.

(10) Patent No.: US 10,419,216 B2
(45) Date of Patent: Sep. 17, 2019

(54) KEYING INFRASTRUCTURE

(71) Applicant: Microsoft Technology Licensing, LLC, Redmond, WA (US)

(72) Inventors: Niels T. Ferguson, Redmond, WA (US); Magnus Bo Gustaf Nystrom, Sammamish, WA (US); Dave M. McPherson, Bothell, WA (US); Paul England, Bellevue, WA (US); Mark Fishel Novak, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 15/458,543

(22) Filed: Mar. 14, 2017

(65) Prior Publication Data

US 2017/0187526 A1 Jun. 29, 2017

Related U.S. Application Data

(62) Division of application No. 14/230,812, filed on Mar. 31, 2014, now Pat. No. 9,633,210.

(Continued)

(51) Int. Cl.
*G06F 21/00* (2013.01)
*H04L 9/08* (2006.01)
(Continued)

(52) U.S. Cl.
CPC .......... *H04L 9/0861* (2013.01); *G06F 9/4401* (2013.01); *G06F 21/57* (2013.01);
(Continued)

(58) Field of Classification Search
CPC ...... G06F 21/602; G06F 21/57; G06F 21/575; G06F 9/4401; H04L 9/0836;
(Continued)

(56) References Cited

U.S. PATENT DOCUMENTS 5,673,316 A 9/1997 Auerbach et al.
5,696,827 A 12/1997 Brands
(Continued)

FOREIGN PATENT DOCUMENTS

| CN | 102204299 A | 9/2011 |
|---|---|---|
| EP | 2746981 A1 | 6/2014 |
| WO | WO2011130211 | 10/2011 |

OTHER PUBLICATIONS

"Building a Secure System using TrustZone Technology", In Whitepaper PRD29-GENC-009492C, ARM Security Technology, Dec. 6, 2010, 108 pages.
(Continued)

*Primary Examiner* — Tri M Tran
(74) *Attorney, Agent, or Firm* — Arent Fox LLP (57) ABSTRACT

A keying infrastructure may generate and/or manage cryptographic keys. The cryptographic keys may include identity keys, encryption keys, and a variety of other types of keys. The cryptographic keys may be derived or created with a key derivation function (KDF) or other one-way function. The cryptographic keys may include keys that are accessible to a boot loader, keys that are accessible to particular components of a Trusted Execution Environment (TrEE), and so on. In some examples, a key may be derived from a preceding key in a sequence of keys. The preceding key may be deleted when the key is derived.

20 Claims, 5 Drawing Sheets

Related U.S. Application Data (60) Provisional application No. 61/877,789, filed on Sep. 13, 2013.

(51) Int. Cl.
  *G06F 21/57*       (2013.01)
  *G06F 21/60*       (2013.01)
  *G06F 9/4401*      (2018.01)
  *H04L 9/32*        (2006.01)

(52) U.S. Cl.
  CPC .......... *G06F 21/575* (2013.01); *G06F 21/602* (2013.01); *H04L 9/0836* (2013.01); *H04L 9/0866* (2013.01); *H04L 9/3234* (2013.01); *H04L 2209/38* (2013.01)

(58) Field of Classification Search
  CPC . H04L 9/0866; H04L 2209/38; H04L 9/0861; H04L 9/3234
  See application file for complete search history.

(56) References Cited

U.S. PATENT DOCUMENTS

| | | | |
|---|---|---|---|
| 5,850,443 | A | 12/1998 | Van Oorschot et al. |
| 5,875,247 | A | 2/1999 | Nakashima et al. |
| 5,978,475 | A | 11/1999 | Schneier et al. |
| 6,230,272 | B1 | 5/2001 | Lockhart et al. |
| 6,243,466 | B1 | 6/2001 | Young et al. |
| 6,282,295 | B1 | 8/2001 | Young et al. |
| 6,470,450 | B1 | 10/2002 | Langford et al. |
| 6,513,117 | B2 | 1/2003 | Tarpenning et al. |
| 6,754,829 | B1 | 6/2004 | Butt et al. |
| 6,757,829 | B1 | 6/2004 | Laczko, Sr. et al. |
| 6,975,728 | B1 | 12/2005 | Eye et al. |
| 6,976,165 | B1 | 12/2005 | Carpentier et al. |
| 7,228,430 | B2 | 6/2007 | Benayoun et al. |
| 7,263,608 | B2 | 8/2007 | Challener et al. |
| 7,496,768 | B2 | 2/2009 | Roberts et al. |
| 7,836,309 | B2 | 11/2010 | Holt et al. |
| 7,886,353 | B2 | 2/2011 | Avraham et al. |
| 8,156,298 | B1 | 4/2012 | Stubblefield |
| 8,375,221 | B1 | 2/2013 | Thom et al. |
| 8,583,908 | B2 | 11/2013 | Zimmer et al. |
| 9,319,220 | B2 | 4/2016 | Grewal et al. |
| 2003/0053630 | A1 | 3/2003 | Elliott et al. |
| 2004/0019828 | A1* | 1/2004 | Gergen ............... G06F 11/3636 714/30 |
| 2004/0098591 | A1 | 5/2004 | Fahrny |
| 2004/0190721 | A1 | 9/2004 | Barrett et al. |
| 2004/0218762 | A1 | 11/2004 | Le Saint et al. |
| 2005/0091487 | A1 | 4/2005 | Cross et al. |
| 2005/0138384 | A1 | 6/2005 | Brickell et al. |
| 2006/0143446 | A1 | 6/2006 | Frank et al. |
| 2007/0028116 | A1 | 2/2007 | Murison et al. |
| 2007/0136349 | A1 | 6/2007 | Shenbagam et al. |
| 2007/0192329 | A1 | 8/2007 | Croft et al. |
| 2009/0092252 | A1 | 4/2009 | Noll et al. |
| 2009/0193513 | A1 | 7/2009 | Agarwal et al. |
| 2009/0327741 | A1 | 12/2009 | Zimmer et al. |
| 2011/0022812 | A1 | 1/2011 | van der Linden et al. |
| 2011/0130211 | A1 | 6/2011 | Izumino et al. |
| 2011/0276699 | A1 | 11/2011 | Pedersen |
| 2011/0302638 | A1 | 12/2011 | Cha et al. |
| 2012/0023554 | A1 | 1/2012 | Murgia et al. |
| 2013/0007239 | A1 | 1/2013 | Agarwal et al. |
| 2013/0031374 | A1 | 1/2013 | Thom et al. |
| 2013/0080764 | A1 | 3/2013 | Khosravi et al. |
| 2013/0097424 | A1 | 4/2013 | Simon et al. |
| 2013/0159704 | A1 | 6/2013 | Chandrasekaran |
| 2013/0159726 | A1* | 6/2013 | McKeen ................. G06F 21/72 713/189 |
| 2013/0182838 | A1 | 7/2013 | Kelley et al. |
| 2014/0040890 | A1 | 2/2014 | Novak et al. |
| 2014/0095918 | A1 | 4/2014 | Stahl et al. |
| 2014/0123207 | A1 | 5/2014 | Agarwal et al. |
| 2014/0130124 | A1 | 5/2014 | Ekberg |
| 2014/0258736 | A1 | 9/2014 | Merchan et al. |
| 2014/0380425 | A1 | 12/2014 | Lockett et al. |
| 2015/0078550 | A1 | 3/2015 | Ferguson et al. |
| 2015/0082048 | A1 | 3/2015 | Ferguson et al. |
| 2016/0080320 | A1 | 3/2016 | Barakat et al. |

OTHER PUBLICATIONS

"DI Service Management—2008 NPL", retrieved on Aug. 30, 2015 at «http://www.di-mgt.com.au/cryptoKDFs.html», DI Management Services Pty Limited, 2008, 7 pages.

Ekberg, Jan-Erik, "Securing Software Architectures for Trusted Processor Environments", In Doctoral Dissertations, Aug. 5, 2014, 92 pages.

Gallery, et al., "Trusted Mobile Platforms", In Book of Foundations of Security Analysis and Design IV, Aug. 18, 2007, 43 Pages.

"International Preliminary Report on Patentability Issued in PCT Application No. PCT/US2015/049535", dated Nov. 24, 2016, 8 Pages.

International Preliminary Report on Patentability dated Dec. 23, 2015 for PCT application PCT/US2014/055058, 19 pages.

"International Preliminary Report on Patentability Issued in PCT Patent Application No. PCT/US2014/054458", dated Dec. 23, 2015, 7 Pages.

Office action for U.S. Appl. No. 14/485,737, dated Dec. 17, 2015, Barakat et al., "Trusted Execution Environment Extensible Computing Device Interface", 26 pages.

Office action for U.S. Appl. No. 14/485,737, dated Dec. 6, 2016, Barakat et al., "Trusted Execution Environment Extensible Computing Device Interface", 20 pages.

Office action for U.S. Appl. No. 14/230,812, dated Feb. 12, 2016, Ferguson et al., "Keying Infrastructure", 14 pages.

Office action for U.S. Appl. No. 14/230,918, dated Feb. 15, 2017, Ferguson et al., "Security Processing Unit With Configurable Access Control", 11 pages.

Office action for U.S. Appl. No. 14/230,918, dated May 6, 2016, Ferguson et al., "Security Processing Unit With Configurable Access Control", 10 pages.

Office action for U.S. Appl. No. 14/485,737, dated Jun. 21, 2016, Barakat et al., "Trusted Execution Environment Extensible Computing Device Interface", 32 pages.

Office action for U.S. Appl. No. 14/230,918, dated Aug. 22, 2016, Ferguson et al., "Security Processing Unit With Configurable Access Control", 10 pages.

Office action for U.S. Appl. No. 14/230,812, dated Sep. 16, 2015, Ferguson et al., "Keying Infrastructure", 12 pages.

PCT Search Report & Written Opinion for Application PCT/US20115/049535, dated Nov. 27, 2015, 20 pages.

The PCT Written Opinion dated Aug. 13, 2015 for PCT application No. PCT/US2014/055058, 9 pages.

The PCT Written Opinion dated Aug. 13, 2015 for PCT application No. PCT/US2014/054458, 6 pages.

The PCT Written Opinion of the International Preliminary Examining Authority for PCT application No. PCT/US2015/049535, 7 pages.

Ryan, "Introduction to the TPM 1.2", Mar. 24, 2009, University of Birmingham, 17 pages.

"International Search Report and Written Opinion received for International Patent Application No. PCT/US2014/054458", dated Sep. 5, 2014, 11 Pages.

"International Search Report & Written Opinion Issued in PCT Patent Application No. PCT/US2014/055058", dated Dec. 11, 2014, 12 Pages.

"The Trusted Execution Environment", In White Paper, GlobalPlatform, Feb. 2011, 26 pages.

U.S. Appl. No. 14/230,812, Ferguson, et al., "Keying Infrastructure ", filed Mar. 3, 2014.

U.S. Appl. No. 14/230,918, Ferguson, et al., "Security Processing Unit with Configurable Access", filed Mar. 31, 2014.

"Office Action Issued in Chinese Patent Application No. 201480050602. 6", dated Feb. 26, 2018, 10 Pages.

(56) References Cited

OTHER PUBLICATIONS

Office action for U.S. Appl. No. 14/485,737, dated Apr. 17, 2017, Barakat et al., "Trusted Execution Environment Extensible Computing Device Interface", 23 pages.
Office action for U.S. Appl. No. 14/230,918, dated Jun. 12, 2017, Ferguson et al., "Security Processing Unit With Configurable Access Control", 13 pages.

* cited by examiner

KEYING INFRASTRUCTURE

RELATED APPLICATIONS

This application claims priority to and is a divisional application of U.S. patent application Ser. No. 14/230,812, filed Mar. 31, 2014, which claims the benefit of U.S. Provisional Application No. 61/877,789, filed Sep. 13, 2013, the entire contents of which are incorporated herein by reference.

BACKGROUND

Cryptographic keys are often used by devices to protect confidential or sensitive information, verify that a device has not been compromised, utilize a hardware element, or to perform a variety of other operations. In some instances, an unauthorized party may gain access to a key and disrupt operation of the device or gain access to protected or sensitive information. As an increasing number of devices seek to protect information, verify authenticity, and/or utilize hardware elements, there is an increasing need to guard cryptographic keys from unauthorized access.

SUMMARY

This disclosure describes a keying infrastructure directed to generating and/or managing cryptographic keys. The cryptographic keys may include identity keys used during an attestation process in which a device communicates with another device to identify the device and/or verify a particular application state (e.g., a safe state that is not compromised). The cryptographic keys may include encryption keys used to protect confidential and/or sensitive information. The cryptographic keys may also include other keys.

In some embodiments, the keying infrastructure generates a key hierarchy of identity, encryption, or other types of keys with a key derivation function (KDF) or other one-way function. The key hierarchy may include keys that are accessible to a boot loader of a device, keys that are accessible to particular components of a Trusted Execution Environment (TrEE), and so on. Additionally, or alternatively, the key hierarchy may include a sequence of keys, where each key in the sequence is derived with a KDF that is based on a preceding key in the sequence. Once a key is derived, the preceding key may be deleted to avoid unauthorized access to the key. In some instances, the key hierarchy may include keys that are associated with an update to a security configuration of a component of the TrEE. Further, the key hierarchy may include keys that are based on a type of platform that is being implemented, a debug status of a device, and/or a variety of other information.

This Summary is provided to introduce a selection of concepts in a simplified form that are further described below in the Detailed Description. This Summary is not intended to identify essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes a keying infrastructure directed to generating and/or managing cryptographic keys. The cryptographic keys may include identity keys, encryption keys, and/or a variety of other types of keys. The cryptographic keys may be derived or created with a key derivation function (KDF) or other one-way function. The cryptographic keys may include keys that are accessible to a boot loader, keys that are accessible to particular components of a Trusted Execution Environment (TrEE), and so on.

In various embodiments, the keying infrastructure may generate a key hierarchy that is composed of a sequence of identity and/or encryption keys referred to collectively as "application keys." An application key may be derived with a KDF or other one-way function each time a component, such as an application, is loaded and/or executed on a device. The application key may be derived based on a preceding application key in the sequence of application keys and the component that is loaded and/or executed. Once the application key is derived, the preceding application key may be deleted to avoid unauthorized access to the preceding application key. An application key that remains in the sequence of application keys may be utilized to verify an application state of the device, to encrypt data and/or to perform other operations.

In various embodiments, the keying infrastructure generates a key for an encryption key hierarchy that is associated with an update to a security configuration of a device. For example, when a security configuration of a TrEE loader is updated, a new encryption key that is accessible to the TrEE loader may be derived based on a random value that is associated with the updated security configuration of the TrEE loader. Further, when a security configuration of a TrEE core is updated, a new encryption key that is accessible to the TrEE core may be derived based on a security version number of the updated security configuration of the TrEE core. Further, in various embodiments the keying infrastructure may generate keys that are based on a type of platform that is being implemented on a device, a debug status indicating whether or not debugging is enabled or disabled and/or a number of times that debugging has been enabled or disabled, and/or a variety of other information.

In many instances, the keying infrastructure described herein may increase the protection of cryptographic keys from unauthorized access. In one example, by deriving various identity and/or encryption keys with a KDF, the keys may be less susceptible to unauthorized use. Further, in instances when a preceding key in a sequence of keys is deleted, such as upon the derivation of a subsequent key in the sequence of keys, the preceding key may be made inaccessible. Additionally, by providing different components of a device with different keys, a device may further protect the keys from unauthorized access and may avoid regenerating keys for each component anytime a single component is compromised. Further, unauthorized access to keys may be avoided by including keys that are associated with updates to security configurations of a TrEE loader and/or TrEE core.

This brief introduction is provided for the reader's convenience and is not intended to limit the scope of the claims, nor the proceeding sections. Furthermore, the techniques described in detail below may be implemented in a number of ways and in a number of contexts. Example implementations and contexts are provided with reference to the following figures, as described below in more detail. It is to be appreciated, however, that the following implementations and contexts are only examples of many.

Example Environment

Figure 1:
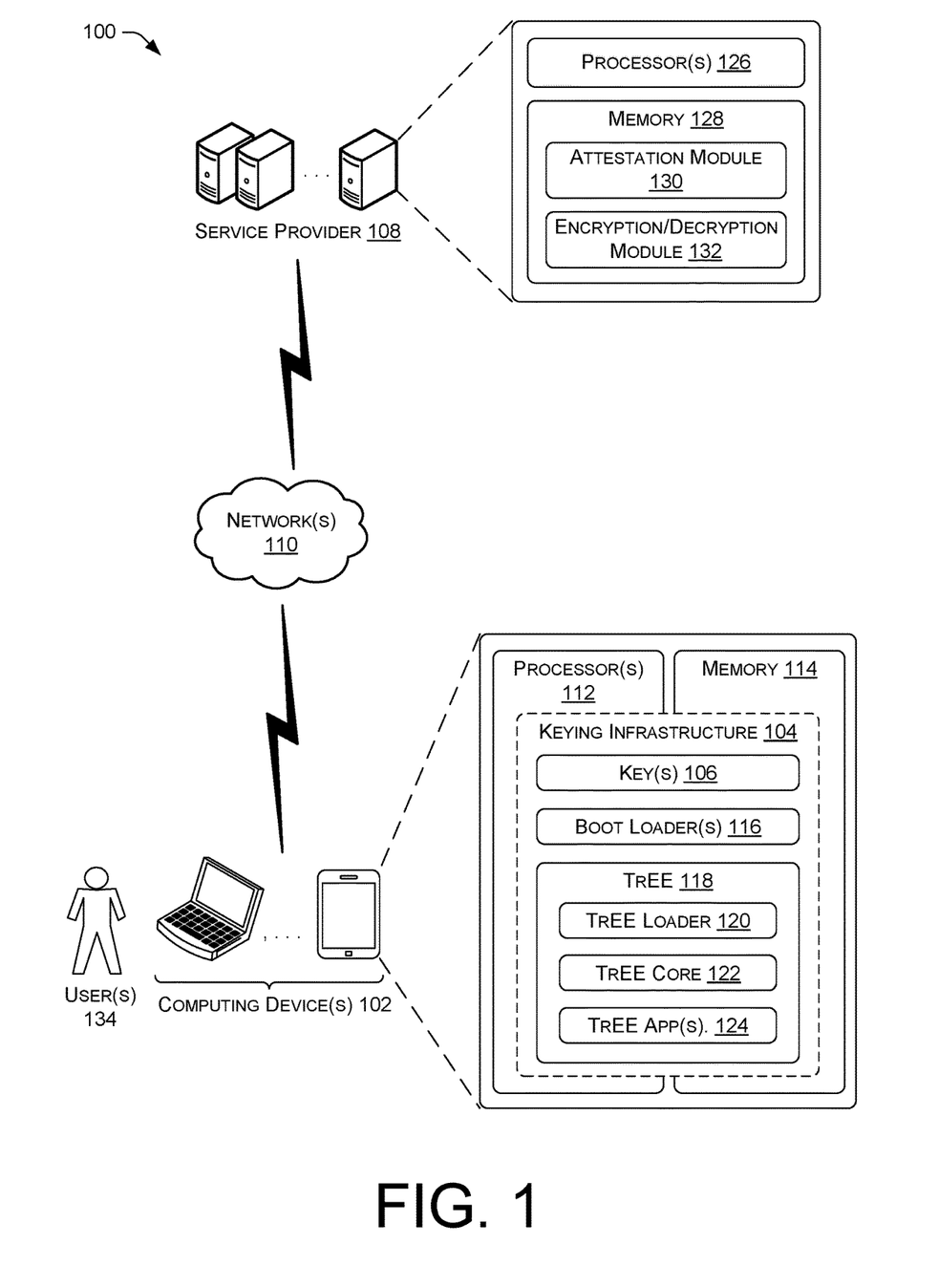
FIG. 1 illustrates an example environment in which techniques described herein may be implemented.

FIG. 1 illustrates an example environment 100 that is usable to implement the system and/or processes associated with the keying infrastructure described herein. The environment 100 includes a computing device 102 (hereinafter "the computing device 102") having a keying infrastructure 104 that generates and/or manages one or more cryptographic keys 106 (hereinafter "the keys 106"). The environment 100 also includes a service provider 108 to provide one or more services to the computing device 102. The service provider 108 may assist in generating and/or managing the keys 106. For example, the service provider 108 may store one or more of the keys 106 to identify the computing device 102 and/or verify a particular application state of the computing device 102. In various embodiments, the computing device 102 may communicate with the service provider 108 via one or more networks 110, such as the Internet, a Mobile Telephone Network (MTN), or other various communication technologies.

The computing device 102 may include, but is not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer or any other electronic device.

The computing device 102 may include one or more processors 112 (hereinafter "the processor 112") and memory 114. The processor 112 may be a single processing unit or a number of units, each of which could include multiple different processing units. The processor 112 may include one or more microprocessors, microcomputers, microcontrollers, digital signal processors, central processing units (CPUs), graphics processing units (GPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor 112 may be configured to fetch and/or execute computer-readable instructions stored in the memory 114.

The memory 112 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

In some instances, the processor 112 and/or the memory 114 may include one or more fuses to store information, such as one or more of the keys 106 or other information. A fuse may generally include a hardware component that may store information in a permanent non-volatile manner (e.g., once a value is stored, the value cannot be overwritten). A fuse may comprise a wire that may be "burned-out" by causing a threshold amount of electric current to flow through the wire. A fuse that is "burned-out" may be associated with a broken conductive path. A single fuse may store one bit of information. As such, multiple fuses may be used to store a single cryptographic key. In one example, a fuse value is inaccessible for reading and/or writing outside a security processor, and may only be used to "seed" a key derivation function of the security process at boot time (e.g., as input to the key derivation function).

The keying infrastructure 104 may include hardware and/or software components. For example, the keying infrastructure 104 may be implemented by one or more modules stored in the memory 114 and/or by one or more components of the processor 112. As such, the keying infrastructure 104 is illustrated in FIG. 1 as overlapping the processor 112 and the memory 114. As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components, such as FPGAs, ASICs, ASSPs, state machines, CPLDs, other logic circuitry, SoCs, and so on.

The keying infrastructure 104 may include one or more boot loaders 116 (hereinafter "the boot loader 116") and a Trusted Execution Environment (TrEE) 118. The boot loader 116 may include one or more stages of boot loaders, such as a primary boot loader (PBL) that loads a secondary boot loader (SBL). The boot loader 116 may generally be one of the initial components that is executed upon booting the computing device 102 and may load applications, an operating system, the TrEE 118, another run-time environment, and so on. In one example, the boot loader 116 boots the computing device 102 according to one or more stages, where each stage loads a next stage. Each stage in the boot process may be associated with loading and/or executing a component (e.g., an application or other data) and perform other processing described herein. Meanwhile, the TrEE 118 may provide an isolated environment to process, store, and otherwise protect confidential and/or sensitive information. The TrEE 118 may reside in the processor 112 and/or as one or more modules in the memory 114 and may provide a higher level of protection to attacks than, for example, a general purpose operating system. In one example, the TrEE 118 may be implemented as the "trust zone" of ARM processor.

The TrEE 118 may include the TrEE loader 120 to load or boot a TrEE core 122 and perform other functionality. Upon loading or booting the TrEE core 122, the TrEE loader 120 may return to a non-executed state. In some instances, the TrEE core 122 may operate similar to a kernel of an operating system. The TrEE core 122 may generally implement the TrEE 118 at run-time. The TrEE core 122 may load and/or execute one or more TrEE applications 124 that execute within the TrEE 118. For illustrative purposes, and without limitation, a TrEE application may include a banking application to carry out banking transactions, a purchase application to purchase an item with a pay phrase, an application to update an operating system, and so on. The TrEE core 122 may utilize the keys 106 to encrypt/decrypt data and/or verify an application state of the computing device 102 for the one or more TrEE applications 124. That is, the TrEE core 122 may perform various processes with the keys 106 without making the keys 106 available to the one or more TrEE applications 124.

The boot loader 116 and/or TrEE 118 may generally generate and/or manage the keys 106. The keys 106 may include identity keys, encryption keys, hardware keys, and/or a variety of other types of keys that are derived via a key derivation function (KDF) or other one-way function. A KDF may receive a key, random value, and/or other information and output a key. The keys 106 may be arranged in a hierarchy with different levels of accessibility to the components of the keying infrastructure 104. To illustrate, the keys 106 may include a key that is only accessible to the boot loader 116, the TrEE loader 120, and/or the TrEE core 122. The keys 106 may be generated during provisioning of the computing device 102 (e.g., during the manufacturing process or shortly thereafter), at boot time by the boot loader 116 or TrEE loader 120, and/or at run-time by the TrEE core 122. Example key hierarchies are discussed in further detail below in reference to FIGS. 2 and 3.

In various embodiments, a key of the keys 106 may be generated and/or stored during provisioning of the computing device 102. Provisioning may generally include configuring the computing device 102 for deployment to end-users and others and may occur at the time of manufacturing or shortly thereafter. For example, at the time of manufacturing, a root key may be generated for the computing device 102 and stored in fuses in the computing device 102. This root key may be used to derive a root identity key, which may be used to derive a platform key. The root identity key and/or platform key may be provided to the service provider 108 and/or a data store along with a device identifier that identifies the computing device 102. The service provider 108 and/or data store may maintain these keys in order to perform an attestation process, as described in further detail below.

The service provider 108 may include one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, storage resources, and the like, that operate remotely from the computing device 102.

The one or more computing devices of the service provider 108 may include one or more processors 126 and memory 128. The one or more processors 126 may comprise a single processing unit or a number of units, each of which could include multiple different processing units. The one or more processors 126 may include, for example, one or more microprocessors, microcomputers, microcontrollers, digital signal processors, CPUs, GPUs, security processors (e.g., secure cryptoprocessors), etc.

The memory 128 may include an attestation module 130 to perform an attestation process in which the computing device 102 communicates with the service provider 108 to identify the computing device 102 and/or verify a particular application state (e.g., a safe state that is not compromised, tampered with, subjected to malware, etc.). To do so, the attestation module 130 may utilize a root identity key and/or platform identity key that was made available during provisioning of the computing device 102 and may utilize a log of applications that have been loaded and/or executed on the computing device 102. The attestation module 130 may perform substantially the same operations that are performed at the computing device 102 to generate a key hierarchy from the root identity key and/or platform identity key. The end-result of the key hierarchy that is generated at the computing device 102 and/or other information that is derived from the key hierarchy may be provided to the attestation module 130, where it is compared to information that is generated at the attestation module 130. If the information matches, the computing device 102 may be identified and/or verified that it is associated with a particular application state. The service provider 108 may comprise and/or be associated with an attestation service. In some instances, the service provider 108 is associated with an attestation service for a particular type of platform (e.g., operating system).

The memory 128 may also include an encryption/decryption module 132 to encrypt and/or decrypt data to securely communicate with the computing device 102. In one example, the computing device 102 may encrypt data at the computing device 102 with an encryption key of an encryption hierarchy described herein and the encryption/decryption module 132 may decrypt the data. In another example, the encryption/decryption module 132 may encrypt data with an encryption key of an encryption hierarchy described herein and the computing device 102 may decrypt the data.

Although the keys 106 are illustrated as being stored at the computing device 102, in various embodiments any number of the keys 106 may be stored and/or managed by the service provider 108. This may include a root identity/encryption key, platform key, and/or any other type of key.

The environment 100 also includes one or more users 134 to employ the computing device 102. The one or more users 134 may interact with the computing device 102 to perform a variety of operations.

Example Key Hierarchies

Figure 2:
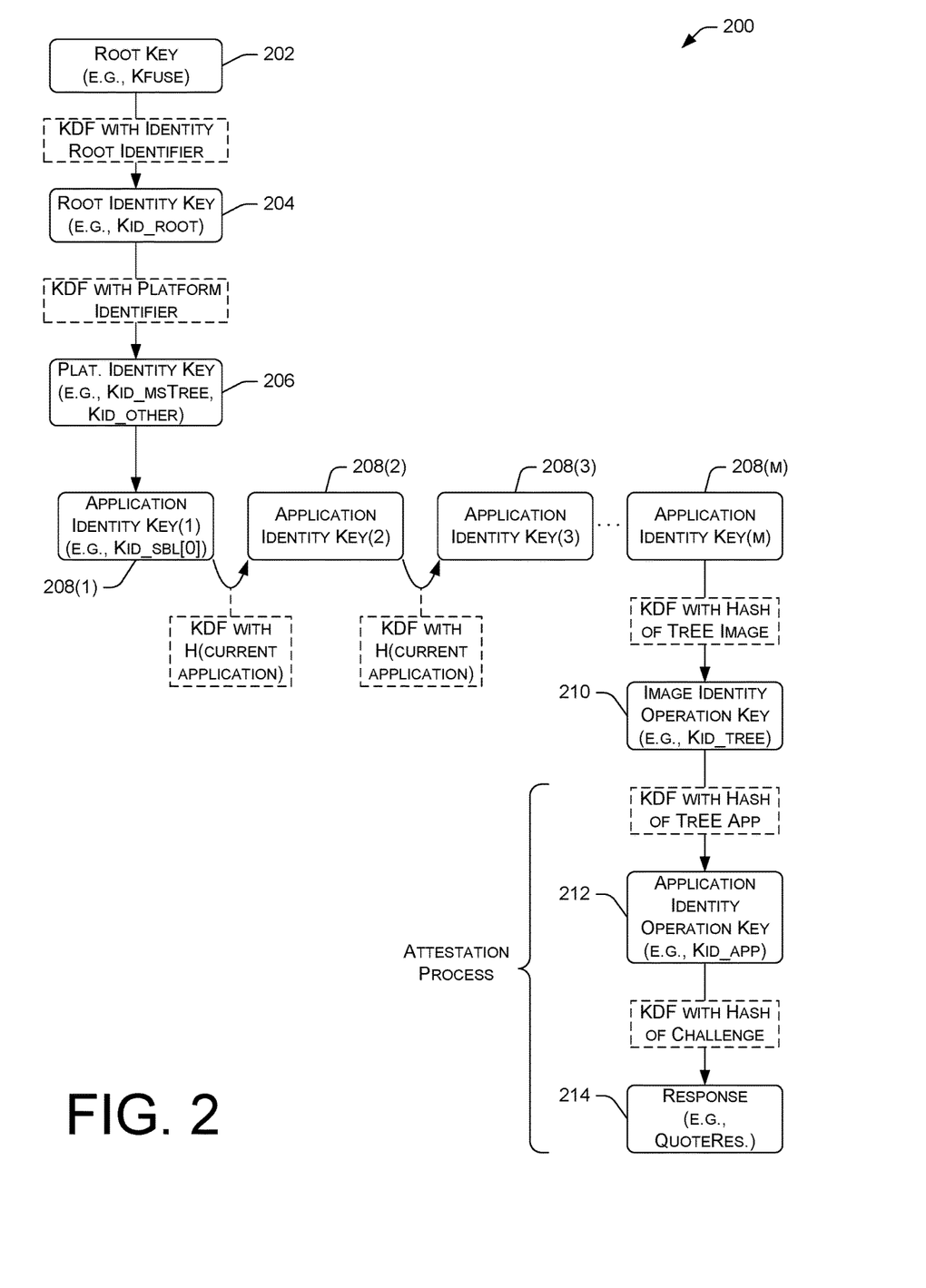
FIG. 2 illustrates an example key hierarchy that includes a sequence of application keys.

FIG. 2 illustrates an example key hierarchy 200 that includes a sequence of applications keys. In this example, the key hierarchy 200 is discussed in the context of identity keys, however, in other examples the key hierarchy 200 may include encryption keys or other types of keys. For ease of illustration, the key hierarchy 200 will be discussed as being generated by the computing device 102 of the environment 100. In other instances, the key hierarchy 200 may be generated by other devices. Although the key hierarchy 200 is discussed as being generated from specific operations and including specific keys, it should be appreciated that any of these operations and/or keys may be omitted in some instances. Further, any of the operations may be simplified.

In this example, the computing device 102 obtains a root key 202 (sometimes referred to as "Kfuse") from multiple fuses of the computing device 102. The root key 202 may have been formed in the fuses during provisioning of the computing device 102. The root key 202 may comprise a unique value for the computing device 102. The root key 202 may be retrieved by the boot loader 116 during a boot process of the computing device 102 (e.g., while booting the computing device 102). In this example, the root key 202 is not made available to other components of the computing device 102 besides the boot loader 116 (e.g., access is restricted to the boot loader 116).

The computing device 102 may utilize the root key 202 to derive or create a root identity key 204 (sometimes referred to as "Kid_root"). The root identity key 204 may be derived or created with a key derivation function (KDF), with inputs (e.g., inputs to the KDF) including the root key 202 and/or an identity root identifier (sometimes referred to as "KDF_ID_ROOT"). The identity root identifier may comprise a unique value that is utilized for an identity key hierarchy. The root identity key 204 may generally be derived or created by the boot loader 116 during a boot process of the computing device 102. In this example, the root identity key 204 is made available to the boot loader 116. Although the root identity key 204 is derived from the root key 202 in the example of FIG. 2, in other examples the root identity key 204 may be retrieved from multiple fuses of the computing device 102.

The computing device 102 may utilize the root identity key 204 to derive or create a platform identity key 206 (sometimes referred to as "Kid_msTree" or "Kid_other"). The platform identity key 206 may be derived or created with a KDF, with inputs including the root identity key 204, a platform identifier (sometimes referred to as a global unique identifier, "GUID"), and/or an identity TrEE identifier (sometimes referred to as "KDF_Tree_ID"). The platform identifier may comprise a unique value that is associated with a platform (e.g., operating system, eco-system, etc.). The platform identifier may be utilized to distinguish identity keys of one type of platform from identity keys of another type of platform. A platform identifier that is associated with a platform of the computing device 102 may be selected to derive or create the platform identity key 206. In one example, the identity TrEE identifier may comprise a unique value that is associated with a TrEE.

The platform identity key 206 may be derived or created by the boot loader 116 during a boot process of the computing device 102. The platform identity key 206 may also be derived or created during provisioning of the computing device 102 and provided to a service provider, such as the service provider 108 of FIG. 1 (e.g., to be utilized in an attestation process). In this example, the platform identity key 206 is made available to the boot loader 116 and the service provider 108. Further, in some instances the platform identity key 206 may be deleted before run-time, so that the key is not available to run-time components of the computing device 102.

The platform identity key 206 may be used to create an initial application identity key 208(1) (sometimes referred to as "Kid_sbl[0]") in a sequence of application identity keys 208(1)-(m) ("Kid_sbl[0]-[m-1]"). That is, the initial application identity key 208(1) may be set to the platform identity key 206. The initial application identity key 208(1) may be set by the boot loader 116, for example.

After the initial application identity key 208(1) is created, a new application identity key may be derived or created for the sequence of application identity keys 208 each time a component, such as an application, is loaded and/or executed. Each application identify key, after the initial application identity key 208(1), may be derived or created with a KDF, with inputs including a preceding application identity key, a boot loader identifier (e.g., which may be unique) (sometimes referred to as "KDF_ID_SBL"), and/or a hash of the component that is being loaded or executed (e.g., a hash of the application source code).

In the example of FIG. 2, an application identity key is derived for each stage of a boot process of the computing device 102 (e.g., a process performed by the boot loader 116). Each stage of the boot process may load and/or execute a component (e.g., an application or other data), derive an application identify key for the sequence of application identity keys 208, delete a preceding application identity key of the sequence of application identity keys 208, and then launch a next stage of the boot process. This may continue any number of times through all stages of the boot process. Since a preceding application identity key is deleted before launching a next stage of the boot process, the preceding application identity key may be inaccessible to the next stage of the boot process. As such, each stage of the boot process may be associated with a different component that is loaded and/or executed.

To illustrate, assume that the computing device 102 has just created the application identity key 208(2). When an application is loaded, the application identity key 208(3) may be derived based on the directly preceding application identity key 208(2), a boot loader identifier (e.g., randomly generated), and a hash of the application. That is, the preceding application identity key 208(2), the boot loader identifier, and the hash of the application may be input to the KDF to derive the application identity key 208(3). Thereafter, the preceding application identity key 208(2) may be deleted (e.g., wiped) to avoid unauthorized access of the application identity key 208(2). In this illustration, an immediately preceding application identity key is deleted, however, in other illustrations any of the preceding application identity keys may be deleted (e.g., when those preceding keys are still maintained).

As noted above, application identity keys may be derived or created for the sequence of application identity keys 208 until the stages of the boot process are complete. That is, until the application identity key 208(m) is created. The application identity key 208(m) may be used to derive an image identity operation key 210 (sometimes referred to as "Kid_tree"). The image identity operation key 210 may be derived with a KDF, with inputs including the application identity key 208(m), a TrEE identity identifier (e.g., which may be unique) (sometimes referred to as "KDF_ID_TREE"), and/or a hash of a TrEE image. The TrEE image may include boot-time and/or run-time TrEE executables, including the TrEE boot code (e.g., the TrEE loader 120), the TrEE core 122, and/or one or more TrEE applications (e.g., the TrEE applications 124). The image identity operation key 210 may be derived during the boot process of the computing device 102 (e.g., by the boot loader 116). The application identity key 208($m$) may be deleted (e.g., wiped) after the image identity operation key 210 is created. The image identity operation key 210 may be made available to the boot loader 116, the TrEE loader 120, the TrEE core 122, and/or the service provider 108.

Thereafter, the TrEE loader 120 may be loaded (e.g., by the boot loader 116) and given access to the image identity operation key 210. The TrEE loader 120 may load the TrEE core 122, which implements the TrEE 118, including loading and/or executing the one or more TrEE applications 124. The TrEE core 122 may maintain the image identity operation key 210 and may continue to operate after the boot process is complete (e.g., including maintaining the image identity operation key 210). As such, in many instances the image identity operation key 210 may remain and not be deleted during run-time of the computing device 102.

The image identity operation key 210 may be used during an attestation process in which the computing device 102 communicates with the service provider 108 to identify the computing device 102 and/or verify a particular application state of the computing device 102 (e.g., a safe state that is not compromised). For instance, the computing device 102 may seek to prove to the service provider 108 that it has a security configuration that satisfies one or more criteria, such as having up-to-date software with the latest security updates (e.g., the most recent software updates) or having a security configuration that is associated with a level of security above a threshold.

During an attestation process, a TrEE application, such as a TPM or other application running in the TrEE 118, may desire to verify that the computing device 102 has not been compromised in order to perform a particular task (e.g., open a secure communication channel, use a password to login, etc.). To do so, the TrEE application may send a request to the service provider 108 to verify the application state of the computing device 102. The request may include a device identifier of the computing device 102 (e.g., a unique value identifying the computing device 102) and/or a log of applications that have been loaded within the computing device 102. In some instances, the log may include a hash of the applications that have been loaded, which may have been generated as the applications were loaded within the computing device 102.

In response to the request, the service provider 108 may send a challenge to the TrEE application to verify the application state of the computing device 102. The challenge may include a random value. The computing device 102 may use the random value and an identity key of the key hierarchy 200 to provide a response to the challenge. In sum, the TrEE application may seek to provide a response that indicates that the computing device 102 is who the computing device 102 claims to be (e.g., the computing device 102 is running the applications that have been listed in the log and/or has not been compromised). Since the TrEE application may not have access to keys of the identity key hierarchy 200, the TrEE application may send the challenge to the TrEE core 122 to generate a response to the challenge.

The TrEE core 122 may generate a response by deriving an application identity operation key 212 (sometimes referred to as "Kid_app") with a KDF based on the image identity operation key 210, a TrEE application identifier (sometimes referred to as "KDF_ID_APP"), and/or a hash of the TrEE application. The TrEE core 122 may utilize the application identity operation key 212 to derive a response 214 (sometimes referred to as "QuoteResponse"). The response 214 may be derived with a KDF based on the application identity operation key 212, a response identifier (sometimes referred to as "KDF_QUOTE"), and/or a hash of the challenge. The response 214 may then be provided to the TrEE application and then sent to the service provider 108. As such, the response 214 may comprise a key that generally reflects the image (e.g., applications that are loaded on the computing device 102).

The service provider 108 may utilize the response 214 to identify the computing device 102 and/or verify a particular application state of the computing device 102. In particular, the service provider 108 may retrieve the platform identity key 206 of the key hierarchy 200 by referencing the device identifier of the computing device 102 that was provided to the service provider 108 by the computing device 102. As noted above, the platform identity key 206 may have been provided to the service provider 108, in association with the device identifier, at the time of provisioning of the computing device 102. The service provider 108 may utilize the platform identity key 206 with the log of applications that are loaded within the computing device 102 to generate the application identity keys 208 and the image identity operation key 210 in a similar process that was performed by the computing device 102. In sum, the service provider 108 may seek to replicate the process that was performed at the computing device 102 to generate the key hierarchy 200. The image identity operation key 210 that is generated at the service provider 108 may be used to derive an application identity operation key and, thereafter, a response in a same manner as that done at the computing device 102. The response generated at the service provider 108 may be compared to the response that was provided to the service provider 108 by the computing device 102. When the responses match, the service provider 108 may determine that the computing device 102 is identified and/or verified.

Additionally, or alternatively, in some instances the computing device 102 may be identified and/or verified when the service provider 108 determines that the computing device 102 has a security configuration that satisfies one or more criteria, such as having up-to-date software with the latest security updates (e.g., the most recent software updates) and/or having a security configuration that is associated with a level of security above a threshold. To make such a determination, the service provider 108 may reference the log of applications that are loaded within the computing device 102 and a list of the latest application updates to determine if the computing device 102 has such a security configuration.

In the above example of FIG. 2, the sequence of application identity keys 208 has been described as being created during the boot process of the computing device 102. However, in other instances the sequence of application identity keys 208 may include keys that are created at other times. In some instances, initial keys in the sequence of application identity keys 208 may be created during the boot process of the computing device 102. Here, a preceding application identity key may be deleted when a new application identity key is created, as discussed above. Thereafter, additional application identity keys may be created for the sequence of application identity keys 208 during execution of the TrEE 118. Here, an application identity key may be created each time a component is loaded within the TrEE 118. The additional application identity keys may be maintained by the TrEE core 122. As such, in some instances an application identity key may be generated at run-time of the computing device 102. In instances where an application identity key is created for a component that is loaded within the TrEE 118, an attestation process may include providing a log of that identifies that component to the service provider 108 to verify an application state.

Figure 3:
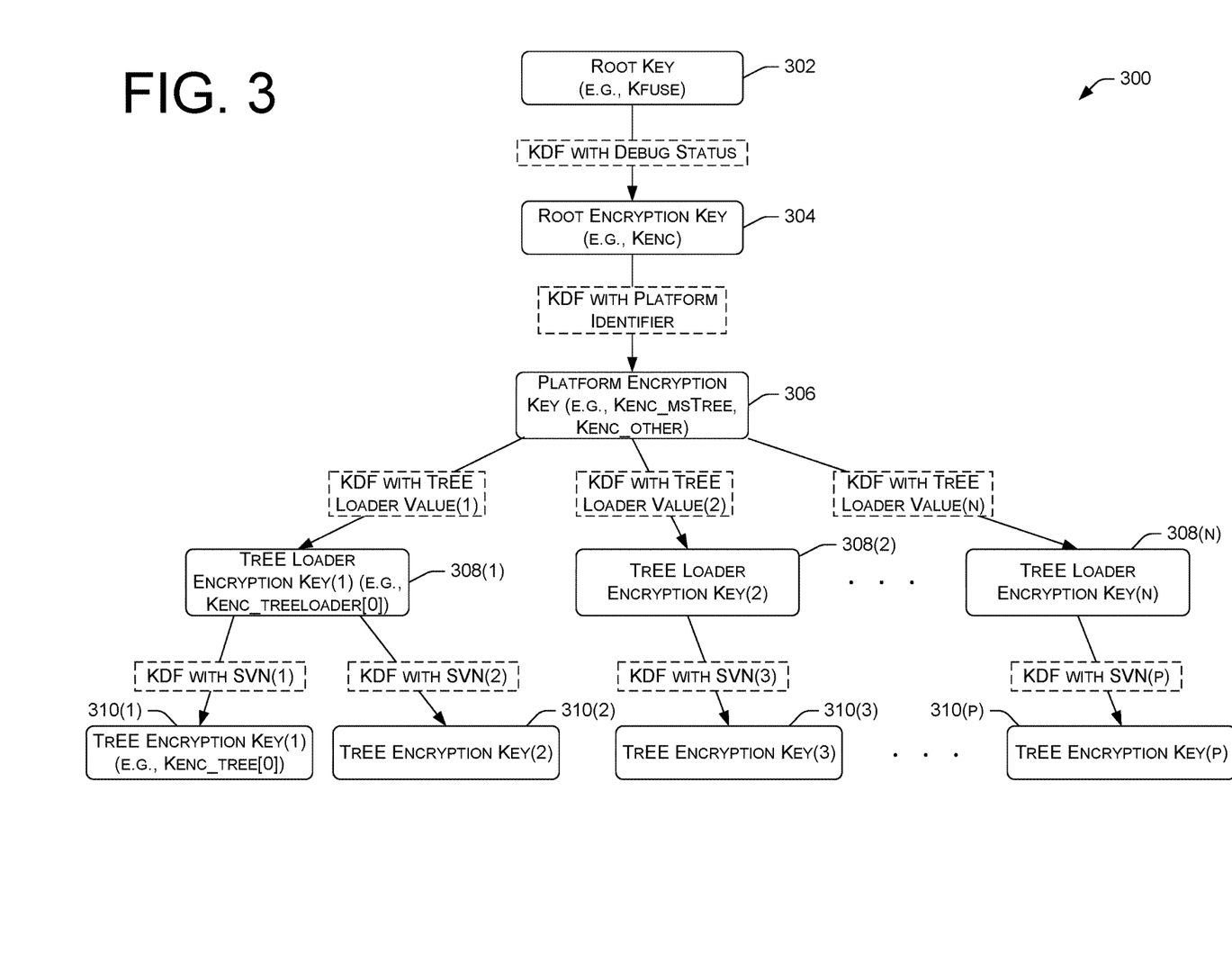
FIG. 3 illustrates an example key hierarchy that is based on a security configuration of a device.

FIG. 3 illustrates an example key hierarchy 300 that is based on a security configuration of a device (e.g., a version of security of a device). In this example, the key hierarchy 300 is discussed in the context of encryption keys, however, in other examples the key hierarchy 300 may include identity keys or other types of keys. For ease of illustration, the key hierarchy 300 will be discussed as being generated by the computing device 102 of the environment 100. In other instances, the key hierarchy 300 may be generated by other devices. Although the key hierarchy 300 is discussed as being generated from specific operations and including specific keys, it should be appreciated that any of these operations and/or keys may be omitted in some instances. Further, any of the operations may be simplified.

In this example, the computing device 102 obtains a root key 302 (sometimes referred to as "Kfuse") from multiple fuses of the computing device 102. The root key 302 may have been formed (e.g., stored) in the fuses during provisioning of the computing device 102. The root key 302 may comprise a unique value for the computing device 102. The root key 302 may generally be retrieved by the boot loader 116 during a boot process of the computing device 102 (e.g., while booting the computing device 102). In this example, the root key 302 is accessible to the boot loader 116 and is not made available to other components of the computing device 102 (e.g., access is restricted to the boot loader 116).

The computing device 102 may utilize the root key 302 to derive or create a root encryption key 304 (sometimes referred to as "Kenc"). The root encryption key 304 may be derived or created with a KDF, with inputs including the root key 302, an encryption identifier (sometimes referred to as "KDF_ENC"), and/or a debug status of the computing device 102 (sometimes referred to as "DebugStatus"). The encryption identifier may comprise a unique value that is utilized for generating an encryption key hierarchy. The root encryption key 304 may generally be derived or created by the boot loader 116 during a boot process of the computing device 102. In this example, the root encryption key 304 is made available to the boot loader 116.

The debug status may indicate whether or not debugging is enabled or disabled for the computing device 102 and/or a number of times that debugging has been enabled or disabled. When debugging is enabled, an entity, such as a service provider or user, may debug the computing device 102 and gain access to cryptographic keys (e.g., which may facilitate debugging). Alternatively, when debugging is disabled, the entity may not debug the computing device 102 and may be restricted from accessing cryptographic keys. Debugging may generally include finding errors in the computing device 102 and/or resolving those errors. The debug status may be stored in a fuse bank (e.g., a set of fuses) in the computing device 102 and may be initially set to zero. Each time debugging is enabled or disabled, the debug status may be incremented. That is, each time debugging is enabled or disabled, a fuse in the fuse bank may be "burned-out." In one example, if the number of "burned-out" fuses is odd, then debugging is enabled. Whereas, if the number of "burned-out" fuses is even, then debugging is disabled. However, in other examples other techniques may be used to indicate whether or not debugging is enabled or disabled. In some instances, the debug status may comprise a binary setting indicating whether or not a device can be debugged. Further, in some instances the debug status may comprise a bitmask indicating various ways in which a device may be debugged (e.g., through Joint Test Action Group (JTAG), kernel debugging, etc.).

The computing device 102 may utilize the root encryption key 304 to derive or create a platform encryption key 306 (sometimes referred to as "Kenc_msTree" or "Kenc_other"). The platform encryption key 306 may be derived or created with a KDF, with inputs including the root encryption key 304, a platform identifier (sometimes referred to as a global unique identifier, "GUID"), and/or an encryption TrEE identifier (sometimes referred to as "KDF_ENC_Tree"). As noted above, the platform identifier may comprise a unique value that is associated with a platform (e.g., operating system, eco-system, etc.). The platform identifier that is associated with a platform of the computing device 102 may be selected to derive or create the platform encryption key 306. The platform encryption key 306 may be derived or created by the boot loader 116 during a boot process of the computing device 102. The platform encryption key 306 may be made available to the boot loader 116. In some instances the platform encryption key 306 may be deleted before run-time, so that the key is not available to run-time components of the computing device 102.

The platform encryption key 306 may be utilized to derive or create TrEE loader encryption keys 308(1)-($n$) (sometimes referred to as "Kenc_treeloader[0]-[$n$-1]"). Each of the TrEE loader encryption keys 308 may be derived or created with a KDF, with inputs including the platform encryption key 306, an encryption TrEE loader identifier (sometimes referred to as "KDF_ENC_TREELOADER"), and/or one of TrEE loader values(1)-($n$) (sometimes referred to as "TreeLoaderEncId[0]-[$n$-1]"). Each time a security configuration of the TrEE loader 120 is updated, such as when information that is accessible to the TrEE loader 120 is made available to an unauthorized party, a new TrEE loader value may be generated at a service provider where the new TrEE loader is generated (e.g., where the new security configuration is generated). A TrEE loader value may comprise a randomly generated value and may be stored for later use. For example, a newly created TrEE loader value may be stored in an array or list that is stored within an executable of the TrEE loader 120 (e.g., within the TrEE image). The array may include previously created TrEE loader values, as well as the newly created TrEE loader value. The executable of the TrEE loader 120 may be provided to the computing device 102 to update the security configuration of the TrEE loader 120. Accordingly, each time a security configuration of the TrEE loader 120 is updated, a new TrEE loader encryption key may be derived from the new TrEE loader value that is included in the new executable of the TrEE loader 120. Since the new TrEE loader value is generated when a new security configuration is updated, and is not previously known, this may prevent unauthorized access to a key that is derived from the TrEE loader value, namely the TrEE loader encryption keys 308. The TrEE loader encryption keys 308 may be derived or created by the boot loader 116 and may be made accessible to the boot loader 116 and/or the TrEE loader 120.

The computing device 102 may utilize the TrEE loader encryption keys 308 to derive or create TrEE encryption keys 310(1)-($p$) (sometimes referred to as "Kenc tree[0]-[1-$p$]"). In this example, "p" represents the number of security configurations to which the TrEE core 122 has been updated. Each of the TrEE encryption keys 310 may be derived or created with a KDF, with inputs including an encryption TrEE identifier (sometimes referred to as "KDF_ENC_TREE"), a security version number (SVN) of a security configuration of the TrEE core 122, and/or one of the TrEE loader encryption keys 308. The TrEE encryption keys 310 may be derived or created by the TrEE loader 120 and may be made available to the TrEE loader 120 and/or the TrEE core 122. Each time a security configuration of the TrEE core 122 is updated (e.g., at a service provider where the new security configuration is generated), a new SVN may be generated for the new security configuration of the TrEE core 122. Thereafter, when the computing device 102 is booted, a TrEE encryption key may be generated for each of the security configurations of the TrEE core 122 (e.g., for each of the SVNs).

In the example of FIG. 3, the TrEE encryption keys 310(1)-(p) may be created for each of the security configurations of the TrEE core 122. In particular, when the computing device 102 is booted, a TrEE encryption key may be created for each of SVNs 1-p corresponding to the security configurations of the TrEE core 122. As also shown in FIG. 3, a security configuration of the TrEE loader 120 has been updated "n" times, and a TrEE loader encryption key has been generated for each of the TrEE loader values 1-n corresponding to the security configurations of the TrEE loader 120. Here, the security configuration of the TrEE core 122 was updated twice before the security configuration of the TrEE loader 120 was updated, as illustrated by the TrEE encryption keys 310(1) and 310(2) being derived from the TrEE loader encryption key 308(1).

As noted above, the different levels of the key hierarchy 300 are made accessible to different components of the computing device 102. This may allow an authorized attack to be isolated within a level and avoid replacing all keys within the key hierarchy 300. In some instances, one or more of the keys at a particular level are stored for later use, such as in an array, so that data that was encrypted with the key may be decrypted after a new encryption key has been generated. For example, the TrEE encryption keys 310 may be stored for later use.

In one example, the key hierarchy 300 may be utilized to encrypt and/or decrypt data. For instance, assume that a TrEE application, such as one of the TrEE applications 124 that is running in the TrEE 118 is attempting to encrypt data, such as a binary large object (Blob) or any other type of data. Here, the TrEE application may send the data to the TrEE core 122 to encrypt the data. As noted above, the TrEE core 122 may maintain the TrEE encryption keys 310 that are used to encrypt the data. In particular, the TrEE core 122 may utilize a most recently derived TrEE encryption key of the TrEE encryption keys 310(1)-(p), such as the TrEE encryption key 310(p), to encrypt the data. When the data needs to be decrypted, a TrEE application may send a request to the TrEE core 122 to decrypt the data with the same key that was used to encrypt the data. By storing the TrEE encryption keys 310, the TrEE core 122 may decrypt data even when a new TrEE encryption key has been derived. The TrEE encryption keys 310 may be maintained by the TrEE core 122 in a more protected environment than that of the TrEE applications.

Although the key hierarchy 300 has been discussed as being created and used by the computing device 102, in some instances the key hierarchy 300 may be created and/or used by other devices, such as the service provider 108. In one example, data may be encrypted at the computing device 102 and decrypted at the service provider 108. The service provider 108 may have access to the root encryption key 304 and/or the platform encryption key 306 and replicate the rest of the key hierarchy 300 (e.g., including the TrEE encryption keys 310) in order to decrypt the data. In another example, the service provider 108 may not store encryption keys and may identify a computing device as being authorized to communicate with the service provider 108 in a secure manner. Here, the computing device and the service provider 108 may agree on an encryption key.

Example Processes

Figure 4:
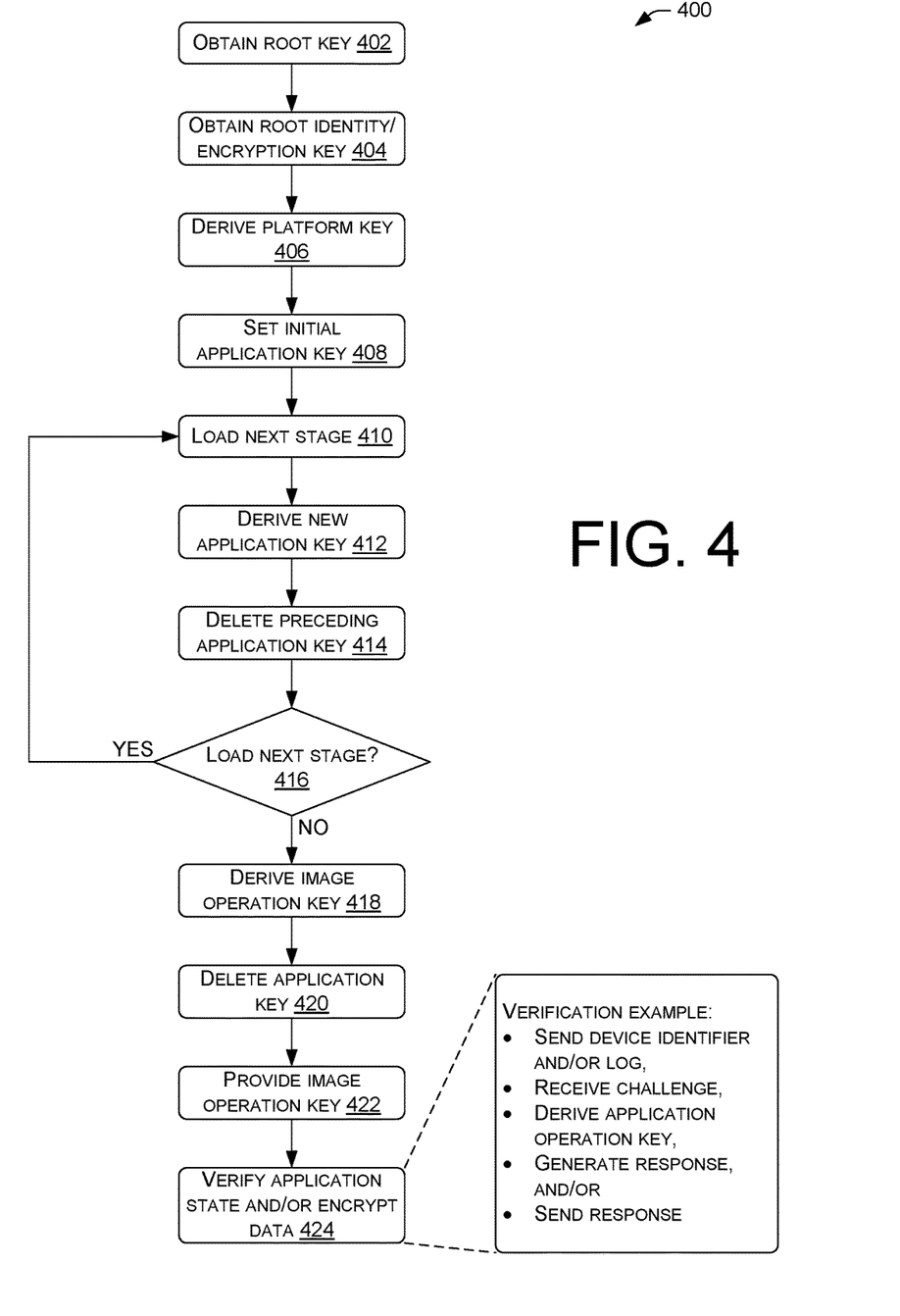
FIG. 4 illustrates an example process to generate a key hierarchy that includes a sequence of application keys.
Figure 5:
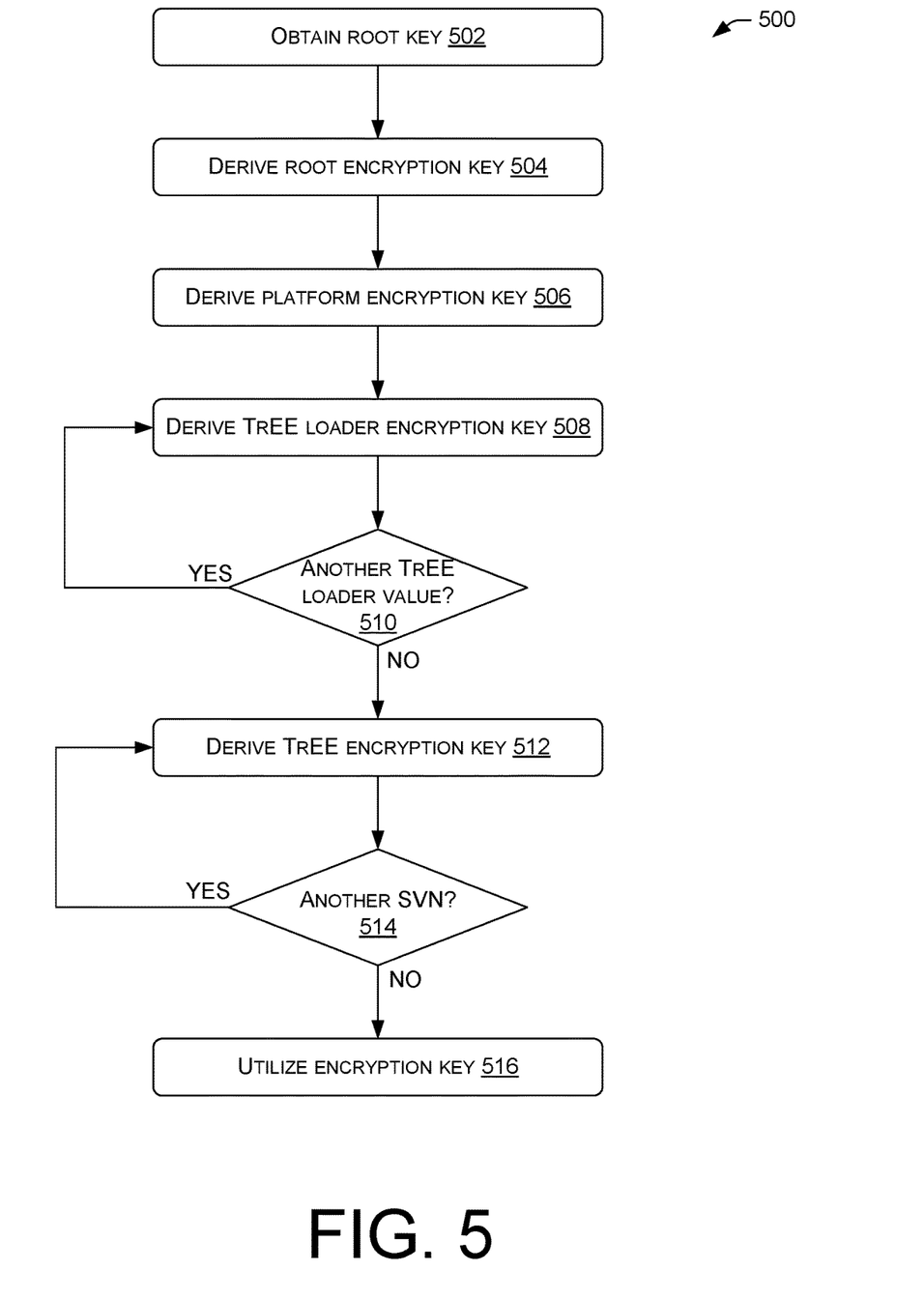
FIG. 5 illustrates an example process to generate an encryption key hierarchy.

FIGS. 4 and 5 illustrate example processes 400 and 500 for employing the techniques described herein. For ease of illustration the processes 400 and 500 are described as being performed in the environment 100 of FIG. 1. For example, one or more of the individual operations of the processes 400 and 500 may be performed by the computing device 102 and/or the service provider 108. However, the processes 400 and 500 may be performed in other environments. Moreover, the environment 100 may be used to perform other processes.

The processes 400 and 500 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, configure the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the individual operations may be omitted.

FIG. 4 illustrates the example process 400 to generate a key hierarchy that includes a sequence of application keys.

At 402, the computing device 102 may obtain a root key for the key hierarchy from multiple fuses of the computing device 102 or other entity. The root key may have been formed in the fuses during provisioning of the computing device 102. The root key may comprise a unique value for the computing device 102, for example.

At 404, the computing device 102 may obtain a root identity or encryption key from multiple fuses or a key derivation function (KDF). For example, when the key hierarchy is associated with identity keys a root identity key may be obtained, whereas when the key hierarchy is associated with encryption a root encryption key may be obtained.

At 406, the computing device 102 may derive or create a platform key with the KDF based on the root identity or encryption key and/or a platform identifier for a platform that is implemented on the computing device 102.

At 408, the computing device 102 may set an initial application key in a sequence of application keys of the hierarchy. The initial application key may be set to the platform key.

At 410, the computing device 102 may load a next stage of a boot process. As noted above, each stage of the boot process of the computing device 102 may be associated with loading and/or executing a different component. As such, the next stage may be loaded when a component is to be loaded and/or executed.

At 412, the computing device 102 may derive an application key for the sequence of application keys with the KDF. The application key may be derived based on a preceding application key that directly precedes the application key in the sequence of application keys and/or a hash of the component (e.g., application) that is loaded or executed (e.g., during the current stage of the boot process). In some instances, an application key may be derived while the computing device 102 is booting. At 414, the computing device 102 may delete the preceding application key upon deriving the application key.

At 416, the computing device 102 may determine whether or not to load a next stage of the boot process. This may include determining whether or not there are other components to load and/or execute during the boot process. When it is determined to load the next stage of the boot process, the process 400 may return to operation 410 (e.g., the YES branch). Alternatively, when it is determined to not load a next stage of the boot process (e.g., there is no further stage to load), the process 400 may proceed to operation 418 (e.g., the NO branch).

At 418, the computing device 102 may derive an image operation key (e.g., image identity operation key) for an image of a Trusted Execution Environment (TrEE) with the KDF. The image operation key may be derived based on the application key that remains in the sequence of application keys (e.g., a last application key in a sequence of application keys) and/or a hash of the image of the TrEE.

At 420, the computing device 102 may delete the application key that remains in the sequence of application keys. This may prevent unauthorized access to the application key.

At 422, the computing device 102 may provide the image operation key to the TrEE, such as a TrEE loader and/or a TrEE core. For example, the TrEE loader may be given authorization to access the image operation key.

At 424, the computing device 102 may utilize the image operation key to verify an application state of the computing device 102 and/or to encrypt/decrypt data. In one example of verifying an application state, the computing device 102 may send, to a service provider, a device identifier of the computing device 102 and a log of applications that have been loaded. The computing device 102 may receive a challenge from the service provider to verify the application state of the computing device. The computing device 102 may then derive, with the KDF, an application operation key (e.g., application identity operation key) for an application that is running within the TrEE based on the image operation key and/or a hash of the application that is running within the TrEE. The computing device 102 may generate a response to the challenge based on the application operation key. The response may be sent to the service provider to verify the application state of the computing device 102. Although shown in FIG. 4 as being performed before receiving the challenge, the computing device 102 may send the device identifier and the log of applications that have been loaded at any time (e.g., after receiving the challenge, after sending the response, or at any other time).

FIG. 5 illustrates the example process 500 to generate an encryption key hierarchy. The encryption key hierarchy may include a root key and encryption keys that are generated with a KDF or other one-way function. Each encryption key of the encryption keys may be generated based on the root key or an encryption key that is closer to the root key than the encryption key.

At 502, the computing device 102 may obtain a root key for the encryption key hierarchy from multiple fuses of the computing device 102 or another entity. The root key may have been formed in the fuses during provisioning of the computing device 102. The root key may comprise a unique value for the computing device 102.

At 504, the computing device 102 may derive a root encryption key for the encryption key hierarchy with a KDF based on a debug status that may indicate whether or not debugging is enabled or disabled and/or a number of times that debugging has been enabled or disabled. In some instances at 504, the computing device 102 may determine the number of times that debugging has been disabled or enabled based on a number of fuses that have been "burned-out."

At 506, the computing device 102 may derive a platform encryption key for the encryption key hierarchy with the KDF based on the root encryption key and/or a platform identifier for a platform that is implemented by the computing device 102.

At 508, the computing device 102 may derive a TrEE loader encryption key with the KDF based on a TrEE loader value and/or the platform encryption key. The TrEE loader value may include a random number and may be stored in information associated with the TrEE, such as within an array of TrEE loader values that is stored in a TrEE loader executable (e.g., TrEE image). As noted above, a new TrEE loader value may be generated at a service provider (e.g., where the new security configuration of the TrEE loader is generated) each time a security configuration of the TrEE loader is updated (e.g., a version of security of the TrEE loader is updated). As such, a TrEE loader encryption key and/or TrEE loader value may be associated with a security configuration of the TrEE loader (e.g., an update to the security configuration).

At 510, the computing device 102 may determine whether or not there is another TrEE loader value. For example, the computing device 102 may reference the array of TrEE loader values, or other information, to determine if another TrEE loader value exists. When it is determined that there is another TrEE loader value, the process 500 may return to the operation 508 (e.g., the YES branch) and derive another TrEE loader encryption key with the other TrEE loader value. This may be repeated any number of times until a TrEE loader encryption key is derived for each TrEE loader value. In one example, when the operation 508 is performed for the first time, it may begin with a first TrEE loader value in the array (e.g., a TrEE loader value that is associated with an initial security configuration of the TrEE loader). A next TrEE loader value in the array may then be used the next time the operation 508 is performed. Alternatively, when it is determined that there is not another TrEE loader value, the process 500 may proceed to operation 512 (e.g., the NO branch).

At 512, the computing device 102 may derive a TrEE encryption key for the encryption key hierarchy with the KDF based on a TrEE loader encryption key and/or a security version number (SVN) of a security configuration of the TrEE core. The TrEE encryption key may be associated with a security configuration of the TrEE core (e.g., an update to the security configuration).

At 514, the computing device 102 may determine whether or not there is another SVN for the security configuration of the TrEE core. Each time a security configuration of the TrEE core is updated, a new SVN is generated for the updated security configuration. Thus, the operation 514 may determine if there is another security configuration for the TrEE core (e.g., a more current security configuration). When it is determined that there is another SVN (e.g., the YES branch), the process 500 may return to the operation 512 and derive a TrEE encryption key for the next SVN. The operation 512 may be repeated until a TrEE encryption key is generated for each SVN (e.g., for each security configuration). To illustrate, if the computing device 102 is booted into security configuration three for the TrEE core (e.g., the TrEE core has been updated three times), then the operation 512 may be performed three times (e.g., once for SVNs 1, 2, and 3). In this illustration, when the operation 512 is performed for the first time, the SVN of the first security configuration of the TrEE core may be used. A next SVN of the TrEE core may then be used the next time the operation 512 is performed. Alternatively, when it is determined that there is not another SVN, the process 500 may proceed to operation 516 (e.g., the NO branch).

At 516, the computing device 102 may utilize an encryption key of the encryption key hierarchy to encrypt and/or decrypt data. For example, the computing device 102 may utilize a TrEE encryption key that was most recently derived to encrypt data (e.g., an encryption key that is furthest from the root key in the encryption key hierarchy).

In some instances, the different keys of the encryption key hierarchy may be accessible to different components of the computing device 102. For instance, a platform encryption key may be accessible to a boot loader that loads the TrEE loader, a TrEE loader encryption key may be accessible to the TrEE loader, and/or a TrEE encryption key may be accessible to the TrEE core.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. One or more non-transitory computer-readable media storing computer-executable instructions, the computer-executable instructions upon execution, to instruct one or more processors to perform operations comprising:
    generating an encryption key hierarchy with a key derivation function, the encryption key hierarchy including (i) a Trusted Execution Environment (TrEE) loader encryption key that is associated with a current security configuration of a TrEE loader and (ii) a TrEE encryption key that is associated with a current security configuration of a TrEE core, the TrEE encryption key being generated based at least in part on the TrEE loader encryption key;
    utilizing the TrEE encryption key to encrypt data;
    derive an application key for a sequence of application keys with the key derivation function, the application key being based on at least one of a preceding application key that directly precedes the application key in the sequence of application keys and a hash of an application that is loaded or executed during a current stage of a boot process; and
    determine whether to load a next stage of the boot process based on whether additional applications are to be loaded and executed during the boot process, wherein the key derivation function is based at least in part on a debug status that indicates a number of times that debugging has been enabled or disabled.

2. The one or more non-transitory computer-readable media of claim 1, wherein the generating includes deriving a platform encryption key for the encryption key hierarchy with the key derivation function, wherein the key derivation function is further based at least in part on a platform identifier for a platform that is implemented by the one or more processors.

3. The one or more non-transitory computer-readable media of claim 2, wherein the generating includes deriving the TrEE loader encryption key for the encryption key hierarchy with the key derivation function, wherein the key derivation function is further based at least in part on the platform encryption key and a TrEE loader value, the TrEE loader value being associated with an update of the TrEE loader from a previous security configuration to the current security configuration.

4. The one or more non-transitory computer-readable media of claim 1, wherein the generating includes deriving the TrEE encryption key for the encryption key hierarchy with the key derivation function, wherein the key derivation function is further based at least in part on a security version number of the current security configuration of the TrEE core.

5. The one or more non-transitory computer-readable media of claim 1, wherein: the TrEE loader encryption key is accessible to the TrEE loader; and the TrEE encryption key is accessible to the TrEE core.

6. The one or more non-transitory computer-readable media of claim 1, wherein the generating includes deriving a root encryption key for the encryption key hierarchy with the key derivation function, wherein the key derivation function is further based at least in part on a debug status that indicates whether or not debugging is enabled or disabled.

7. The one or more non-transitory computer-readable media of claim 1, wherein the generating includes deriving a root encryption key for the encryption key hierarchy with the key derivation function based at least in part on a debug status that indicates a number of times that debugging has been enabled or disabled.

8. A method comprising:
    deriving, by a computing device and with a key derivation function, a Trusted Execution Environment (TrEE) loader encryption key that is associated with a security configuration of a TrEE loader, the TrEE loader being configured to load a TrEE core that implements a TrEE;
    deriving, by the computing device and with the key derivation function, a TrEE encryption key that is associated with a security configuration of the TrEE core, the TrEE encryption key being derived based at least in part on the TrEE loader encryption key;
    utilizing the TrEE encryption key to encrypt data;
    deriving an application key for a sequence of application keys with the key derivation function, the application key being based on at least one of a preceding application key that directly precedes the application key in the sequence of application keys and a hash of an application that is loaded or executed during a current stage of a boot process; and
    determining whether to load a next stage of the boot process based on whether additional applications are to be loaded and executed during the boot process, wherein the key derivation function is based at least in part on a debug status that indicates a number of times that debugging has been enabled or disabled.

9. The method of claim 8, wherein the security configuration of the TrEE loader comprises an updated security configuration and the TrEE loader encryption key is derived based at least in part on a TrEE loader value that is associated with an update of the TrEE loader from a previous security configuration to the updated security configuration.

10. The method of claim 8, further comprising: deriving another TrEE encryption key with the key derivation function, wherein the key derivation function is further based at least in part on the TrEE loader encryption key and an updated security configuration of the TrEE core; and utilizing the other TrEE encryption key to at least one of encrypt other data or decrypt other data.

11. The method of claim 8, further comprising: deriving a root encryption key with the key derivation function, wherein the key derivation function is further based on whether or not debugging is enabled or disabled for the computing device; and deriving a platform encryption key with the key derivation function, wherein the key derivation function is further based at least in part on the root encryption key and a platform identifier for a platform that is implemented by the computing device;

wherein the TrEE loader encryption key is derived based at least in part on the platform encryption key.

12. The method of claim 8, further comprising:

deleting the preceding application key upon deriving the application key; and verifying an application state of the computing device based at least in part on an application key that remains in the sequence of application keys.

13. A computing device comprising:

one or more hardware processors; and one or more computer-readable media storing instructions that, when executed by the one or more hardware processors, cause the one or more hardware processors to perform operations comprising:

generating, with a first key derivation function, a first encryption key that is associated with a security configuration of a Trusted Execution Environment (TrEE) loader; generating, with a second key derivation function, a second encryption key that is associated with a security configuration of a TrEE core, the second encryption key being generated based at least in part on the first encryption key;

utilizing the second encryption key to at least one of encrypt data or decrypt data;

deriving an application key for a sequence of application keys with a third key derivation function, the application key being based on at least one of a preceding application key that directly precedes the application key in the sequence of application keys and a hash of an application that is loaded or executed during a current stage of a boot process; and determining whether to load a next stage of the boot process based on whether additional applications are to be loaded and executed during the boot process, wherein the third key derivation function is based at least in part on a debug status that indicates a number of times that debugging has been enabled or disabled.

14. The computing device of claim 13, the operations further comprising generating, with the third key derivation function, a third encryption key based at least in part on a platform identifier for a platform that is implemented by the one or more processors.

15. The computing device of claim 14, wherein the generating the first encryption key comprises generating, using the first key derivation function, the first encryption key based at least in part on the third encryption key and a TrEE loader value, the TrEE loader value being associated with an update of the TrEE loader from a previous security configuration to the security configuration of the TrEE loader.

16. The computing device of claim 13, wherein the second encryption key is further generated based at least in part on a security version number of the security configuration of the TrEE core.

17. The computing device of claim 13, wherein: the first encryption key is accessible to the TrEE loader; and the second encryption key is accessible to the TrEE core.

18. The computing device of claim 13, the operations further comprising generating, with the third key derivation function, a third encryption key based at least in part on a debug status that indicates whether or not debugging is enabled or disabled.

19. The computing device of claim 13, the operations further comprising:

generating, with the third key derivation function, a third encryption key based at least in part on the first encryption key and an updated security configuration of the TrEE core; and utilizing the third encryption key to at least one of encrypt other data or decrypt other data.

20. The computing device of claim 13, wherein the TrEE loader is configured to load the TrEE core that implements a TrEE.

* * * * *